United States Patent [19]
Wenzel et al.

[11] Patent Number: 5,654,039
[45] Date of Patent: Aug. 5, 1997

[54] RECYCLABLE AND COMPOSTABLE COATED PAPER STOCKS AND RELATED METHODS OF MANUFACTURE

[75] Inventors: Donna J. Wenzel, Middletown; Gene W. Bartholomew, Tuxedo Park; James R. Quick, Greenwood Lake; Morton S. Delozier, Claryville; Maxine Klass-Hoffman, Highland Mills, all of N.Y.

[73] Assignee: International Paper Company, Purchase, N.Y.

[21] Appl. No.: 464,483

[22] Filed: Jun. 5, 1995

Related U.S. Application Data

[60] Division of Ser. No. 290,276, Aug. 15, 1994, which is a continuation-in-part of Ser. No. 59,790, May 10, 1993.

[51] Int. Cl.$^6$ .................................................. B05D 1/38
[52] U.S. Cl. .................... 427/391; 427/392; 427/395; 427/396; 427/411; 427/416; 162/137
[58] Field of Search ............................ 162/135, 136, 162/137; 427/391, 392, 395, 396, 411, 415, 416

[56] References Cited

U.S. PATENT DOCUMENTS

| | | | |
|---|---|---|---|
| 3,196,038 | 7/1965 | Schoch et al. | 117/68 |
| 3,251,709 | 5/1966 | Bonzagni | 117/76 |
| 3,400,008 | 9/1968 | Bleyle et al. | 117/76 |
| 3,423,232 | 1/1969 | Reinhard et al. | 117/76 |
| 3,476,587 | 11/1969 | Demol et al. | 117/76 |
| 3,573,125 | 3/1971 | Elliott | 156/244 |
| 3,579,371 | 5/1971 | Dooley et al. | 117/76 |
| 3,707,393 | 12/1972 | McDonald | 117/76 P |
| 3,873,345 | 3/1975 | Vreeland | 117/65.2 |
| 3,874,905 | 4/1975 | Knights | 117/76 P |
| 3,950,578 | 4/1976 | Laumann | 427/378 |
| 4,010,307 | 3/1977 | Canard et al. | 428/327 |

(List continued on next page.)

FOREIGN PATENT DOCUMENTS

| | | |
|---|---|---|
| 393451 | 10/1990 | European Pat. Off. . |
| 487497 | 5/1992 | European Pat. Off. . |
| 7070982 | 3/1995 | Japan . |

OTHER PUBLICATIONS

Aquabloc H, ADM Tronics Unlimited, Inc. 224–Spegasus Ave. Northvale NJ 07647. Jan. 1990.

Serfene 121, Morton International Specialty Chemicals Group, 333 West Wacker Drive, Chicago, Illinois. Jan. 1991.

Geon 650X18 Latex, B.F. Goodrich, 9911 Brecksville Road, Cleveland, Ohio, 1990.

(List continued on next page.)

*Primary Examiner*—Shrive Beck
*Assistant Examiner*—Erma Cameron
*Attorney, Agent, or Firm*—Ostrager, Chong & Flaherty

[57] ABSTRACT

Recyclable and compostable coated paper stock comprising a substrate coated on at least one surface with a primer coat and a top coat both of which are water based dispersions. The primer coat comprises a water based dispersion of a polymer selected from the group comprising acrylic polymers, acrylic copolymers, polyvinyl acetate, polyvinyl alcohol, poly-ethylene vinyl acetate, poly-ethylene vinyl chloride, styrene butadiene copolymers, polyvinylidiene chloride or starch. The top coat comprises a water based dispersion of a polymer selected from the group comprising acrylic polymers, acrylic copolymers, styrene butadiene copolymers or polyvinylidiene chloride. In another embodiment the top coat further includes a wax component comprising 15–90 wt. % of the polymer and 5–85 wt. % of the wax. The substrate is coated with a primer coat prior to the application of the top coat to seal the substrate surface. The top coat forms a film over the primer coat and imparts water and grease resistant properties to the coated paper stocks. The invention also includes processes for making and using the invented coated paper stocks.

19 Claims, 3 Drawing Sheets

U.S. PATENT DOCUMENTS

| | | | |
|---|---|---|---|
| 4,117,199 | 9/1978 | Gotoh et al. | 428/486 |
| 4,248,939 | 2/1981 | Parsons | 428/508 |
| 4,265,969 | 5/1981 | Yasuda et al. | 428/342 |
| 4,301,210 | 11/1981 | Yasuda et al. | 428/342 |
| 4,714,727 | 12/1987 | Hume, III | 524/271 |
| 4,782,626 | 11/1988 | Shanley et al. | 47/9 |
| 4,844,952 | 7/1989 | Korenkiewicz et al. | 427/258 |
| 5,169,715 | 12/1992 | Maubert et al. | 428/331 |
| 5,250,353 | 10/1993 | Bartholomew et al. | 428/328 |
| 5,332,586 | 7/1994 | Di Mino | 426/87 |
| 5,358,790 | 10/1994 | Rüf et al. | 428/486 |
| 5,384,013 | 1/1995 | Husband et al. | 162/168.1 |
| 5,393,566 | 2/1995 | Propst | 427/348 |

OTHER PUBLICATIONS

Unocal 76 Res 4105, Unocal Corporation, 1201 West 5th Street, Los Angeles, California, Jan. 1990.

Products for Paper and Paperboard Coatings, Rohm and Haas, Philadelphia, PA; Rhoplex Acrylic Emulsions and Polyco Polyvinyl Acetate Emulsions, May 1991.

Alcogum L-36, Alco Chemical, Chattanooga, TN. Oct. 1992.

Coatings and Inks, Foamaster® and Foamasters Defoamers for Synthetis Latex Systems, Henkel Corp., Ambler, PA, Jun. 1992.

Mobilcer C, J, Q, RV, 136 Paper Industry Wax Emulsions, Mobil Product Data Sheet, Mobil Oil Corporation, Fairfax, VA, 1986.

Bacacani, American Printer, vol. 205(6), Sep. 1990, pp. 38–40, "A Coat of Many Colors".

Newnes et al, Resin Review, vol. 19, May 1969, pp. 10–13, "A New Alkai–Swellable Emulsion for Pigmented Paper and Paperboard Coatings".

Tappi, 1992 Coated Paperboard Short Course, Rochester, NY, Oct. 4–Jun. 1992, Davis et al.

RECYCLABLE AND COMPOSTABLE COATED PAPER STOCKS AND RELATED METHODS OF MANUFACTURE

This is a divisional of copending application(s) Ser. No. 08/290,276 filed Aug. 15, 1994 which is a continuation-in-part of Ser. No. 08/059,790 filed May 10, 1993.

FIELD OF INVENTION

This invention generally relates to recyclable and compostable coated paper stocks and related methods of making the same useful as packages or containers having water resistance, grease resistance and moisture vapor barrier characteristics. More particularly, it concerns recyclable and compostable coated paper stocks comprised of a substrate coated on at least one surface with a primer coat and a top coat both of which are applied as water based dispersions. The water based dispersion coatings are readily recycled or breakdown more readily in a composting operation than conventional polyethylene or wax coatings.

BACKGROUND ART

Polyethylene films and wax coatings, which are generally laminated or coated to paper, are widely used in packaging applications to protect products from moisture and provide water or grease resistance. However, recycling of packaging containing polyethylene films and wax coatings are limited and costly since special equipment is necessary for repulping. In addition, the polyethylene films and most wax coatings Will not degrade if the package is composted. Thus it would be desirable to find an alternative for conventional polyethylene films that has comparable moisture barrier properties but also has the added benefit of repulpability and compostability.

The present invention provides a two-step coating process wherein a substrate is coated on at least one surface with a primer and a top coat, both of which are water-based dispersions, to produce a product with moisture barrier properties and easy repulpability. The primer coat, preferably ethylene vinyl acetate, functions to seal the porous substrate to permit effective coating of the top film coat. The top coat or barrier film is preferably a combination of an aqueous acrylic copolymer, preferably a styrenated acrylic copolymer, and a wax dispersion. However, other aqueous polymer dispersions such as polyvinylidene chloride or compositions with or without a wax component can be used.

U.S. Pat. No. 3,196,038 to Schoch et al. discloses a process and apparatus for continuous application of multiple coatings (at least three) on a paper substrate to render the paper web moisture and grease resistant. The base coating is a dispersion selected from the group consisting of polyvinyl chloride,. polyvinyl acetate, polyvinylidene chloride, esters of polyacrylic acid, polystyrol, polyethylene, paraffin and mixtures thereof. The second coat, preferably of the same Composition as the base coating, provides a flexible intermediate layer to which a harder top coat is then applied.

U.S. Pat. No. 3,873,345 to Vreeland discloses a process for producing a high gloss paper with a heat calendaring apparatus. The coating composition used is comprised of a mineral pigment, such as clay and a binder selected from the group consisting of vinyl acetate, Styrene-isoprene and acrylic polymer latices. The polymer latex has a glass transition greater than 100° F.

U.S. Pat. No. 4,248,939 to Parsons discloses a process for coating paper to obtain improved appearance and printablity. A paper substrate is treated with a first layer comprised of an inorganic pigment, such as clay, and binder and a second layer comprised of an organic pigment and binder. The organic pigments used in the second topcoat are prepared by graft copolymerizing in aqueous medium a monoethylenically unsaturated monomer onto a water soluble prepolymer. The water soluble prepolymers used include copolymers of vinyl alcohol and acrylic acid. The organic pigment coating compositions are used to create high gloss paper under less severe calendaring conditions than coating systems using inorganic pigments alone.

U.S. Pat. Nos. 4,265,969 and 4,301,210 to Yasuda et al. disclose processes for preparing cast coated paper having high gloss. The undercoating contains pigment binders and the aqueous overcoating consists of pigments with polymer latex binders having glass transition temperatures over 38° C.

U.S. Pat. No. 4,844,952 to Korenkiewicz et al. relates to multicoated substrates having good stain and grease resistance. A conventional decorative finish coating composition, which is solvent based or aqueous, is applied to the substrate followed by application of a coating of a waterborne polymer composition free of external crosslinking agents (lacquer type coating).

U.S. Pat. No. 5,169,715 to Maubert et al. discloses a high gloss paper produced by applying two coats. The first base coat comprises a synthetic latex, starch, polyvinyl alcohol and proteins. The second gloss coating contains conventional pigments and binders. Acrylic styrene copolymers are used as gloss pigments.

From the prior art mentioned it is seen that waterborne polymers have been used in the production of high gloss paper. Additional aqueous composition coatings including acrylic latexes are shown but also include polyethylene as a component. The art does not provide a process for treating paper substrates with water based dispersions to form a packaging stock that acts as a barrier to moisture vapor and grease without using conventional polyethylene coatings. The invention is directed to the provision of Such recyclable and compostable coated paper stocks. It would be appreciated that advantage over known applications would be obtained by providing water based dispersion coatings which are more readily recycled than polyethylene films and wax coatings and in the provision of a two-step coating process to produce a product with moisture barrier properties and easy repulpability. The water-based coatings of the invention provide an alternative for conventional polyethylene coatings. This obtains an advantage over the prior art since the coated paper can easily be repulped without special flotation equipment, which is needed when repulping polyethylene film. The water-based coatings disperse in water, allowing the paper fibers to be easily reclaimed for reuse. The coated paper of the invention also readily disintegrates when composted.

Accordingly, it is a broad object of the invention to provide a recyclable and compostable coated paper stock comprised of a substrate coated with a primer coat and a top coat, both of which are water-based dispersions.

A more specific object of the invention is to provide a recyclable and compostable coated paper stock having water resistance, grease resistance and moisture vapor barrier characteristics.

Another object of the invention is to provide a recyclable and compostable coated paper stock which is formed into a package or container.

A specific object of the invention is to provide a recyclable and compostable coated paper stock that is readily compostable/biodegradable.

A more specific object of the invention is to provide a recyclable and compostable coated paper stock that is readily recycled without dependence on special equipment for repulping.

DISCLOSURE OF INVENTION

In the present invention, these purposes, as well as others which will be apparent, are achieved generally by coating at least one surface of a substrate with a primer coat and a top coat both of which are applied as water-based dispersions.

The primer coat Comprises a water-based dispersion of a polymer selected from the group comprising acrylic polymers, acrylic copolymers, polyvinyl acetate, polyvinyl alcohol, ethylene-vinyl acetate, polyethylene vinyl chloride, styrene-butadiene copolymers, polyvinylidene chloride or starch. The primer coat may further include a wax component, preferably comprising 5-30 wt. % of the primer coat. The primer coat may further include pigments or mineral fillers, such as, but not limited to, aqueous dispersions of clay, calcium carbonate or mica.

The top coat comprises a water based dispersion of a polymer selected from the group comprising acrylic polymers, acrylic copolymers, styrene- butadiene copolymers or polyvinylidene chloride. In another embodiment the top coat further includes a wax component, such that the dried top coat is comprised of 15-90 wt. % of the polymer and 80-5 wt. % of the wax.

The substrate is coated with the primer coat prior to the application of the top coat to seal the substrate surface. The top coat forms a film over the primer coat and imparts water resistant, grease resistant and water vapor barrier properties to the coated paper stocks.

Other additional components of the primer and top coatings may include thickening agents, defoaming or antifoaming agents, pigments, crosslinking agents, slip additives, release agents and antiblocking agents.

Substrates employed in the invention are cellulose-based materials and include a variety of coated and uncoated paper and paperboard, including bleached or unbleached, hardwood or softwood, virgin or recycled, and clay coated or uncoated forms of paper or paperboard. The basis weight of the substrates are in the range of 20 to 300 lbs per 3,000 sq. ft. and the thicknesses range from 0.004 to 0.025 inches. A preferred substrate is paper and is selected from the group comprising bleached paper, clay-coated bleached paper, unbleached paper or recycled paper.

The primer and top coatings are applied to the substrate surface as aqueous dispersions. The coatings are dried on the substrate surface to form a recyclable and compostable paper stock. The primer and top coatings have total dry coating weights on the substrate in the range of 1 to 20 lbs. per 3,000 sq. ft.

The recyclable and compostable coated paper stock of the invention is formed into a package or beverage container having water resistance, grease resistance and moisture vapor barrier characteristics. In preferred applications the water-based coating corresponds to a moisture vapor barrier located in the internal structure of the package or container. The coating on the substrate surface which corresponds to the interior structure of a package or container performs multiple functions. It provides properties required for the containment of liquid or solid materials; water resistance, grease resistance, moisture vapor protection and FDA compliance.

Other objects, features, and advantages of the present invention will become apparent from the following detailed description of the best mode of practicing the invention when considered with reference to the drawings, as follows:

DETAILED DESCRIPTION OF THE PREFERRED EMBODIMENT

Co-pending application Ser. No. 08/059,790 filed May 10, 1993, which is incorporated herein by reference, discloses use of a primer coat prior to the application of the water-based top coating. The present invention process improves this method.

Figure 2:
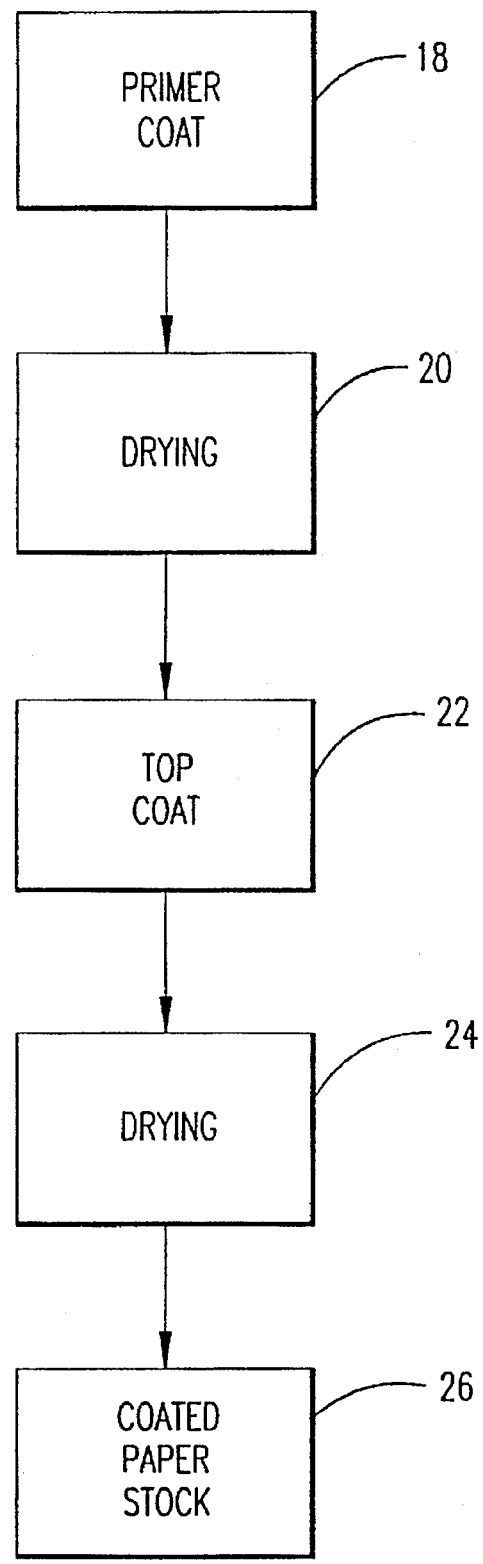
FIG. 2 is a schematic diagram of the method of the invention.

FIG. 2 is a schematic diagram of the general method of the invention. In the first step 18 a primer coat is applied to at least one surface of a substrate. The primer coat substantially seals the porous substrate surface. The primer is generally applied using conventional coating equipment such as rotogravure, flexographic, air knife, blade or Meyer rod coaters. The primer coat is preferably dried using forced hot air ovens prior to the application of the top coat. The top coat 22 is applied over the primer coat and dried 24, to form a pinhole-free film which imparts barrier properties to the coated paper stock 26. Drying 20 between coating applications is preferred to enhance film formation of the top coat. Oven temperatures and line speeds are dictated by choice of the primer and top coating formulations (e.g. % solids), substrate (e.g. basis weight, absorptivity) and equipment characteristics. Sufficient drying conditions, such as the oven temperature, line speed, etc., are required to prevent roll blocking and picking or blistering of the coating during rewinding of the coated substrate.

Figure 1:
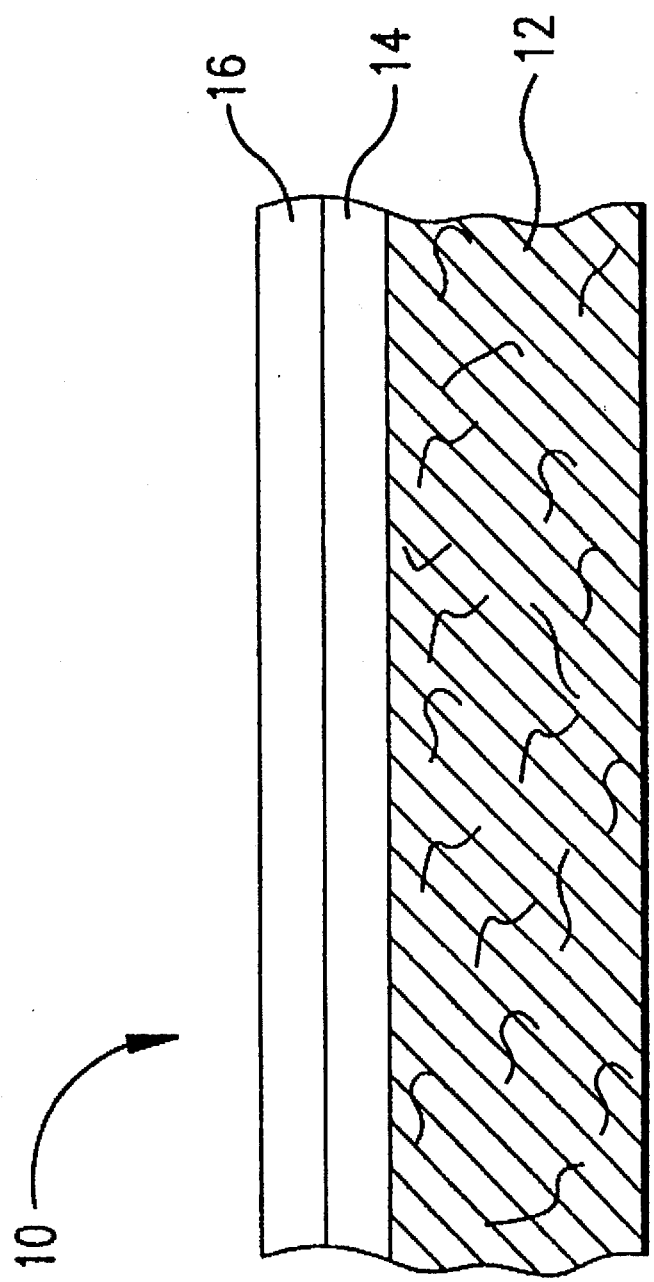
FIG. 1 is an illustration of a recyclable and compostable coated paper stock made in accordance with the method of the invention.

In accordance with the invention as shown in FIG. 1 the recyclable and compostable coated paper stocks are generally comprised of a substrate 12 coated on at least one surface with a primer coat 14 and at least one top coat 16 over the primer coat. The primer coat and top coat are both water-based emulsions or dispersions. The terms "emulsions" and "dispersions" are often used interchangeably. In *Hackh's Chemical Dictionary*, 4th ed., 1969, a dispersed system (or dispersion) is defined as "an apparently homogeneous substance which consists of a microscopically heterogeneous mixture of two or more finely divided phases (solid, liquid or gaseous) e.g. liquid and liquid, solid and gas, etc." An emulsion is defined as "a suspension of a liquid in another liquid" and is considered a type of dispersion. As used in the specification herein in describing the invention coatings the general term "dispersion" is typically used. At ambient temperatures the primer and top coating compositions are generally solid/liquid dispersions, however, the compositions may also be emulsions or liquid/liquid dispersions.

The primer coat is typically a different composition than the top coat, but they may also be the same composition. The primer in itself decreases the penetration of the top coat into the substrate. Examples of materials that comprise the primer coat are water-based dispersions of a polymer selected from the group comprising acrylic polymers, acrylic copolymers, polyvinyl acetate, polyvinyl alcohol, ethylene-vinyl acetate, polyethylene vinyl chloride, styrene-butadiene copolymers, polyvinylidene chloride, or starch. However primers based on other polymers which are capable of sealing the substrate surface are also included.

The materials that comprise the primer coat are generally available commercially under various trademarks and from various manufacturers. Representative polymers or dispersions that may be used include, but are not limited to, Aquabloc™H, which is a water-based acrylic/wax emulsion available from ADM Tronics Unlimited, Inc., 224-S Pegasus Avenue, Northvale, N.J., 07647; Airflex®100 HS which is a water-based ethylene vinyl-acetate emulsion available from Air Products and Chemicals, Inc., Allentown, Pa., 18195; PRECOAT 44 which is a water-based acrylic (poly ethylacrylate latex) emulsion available from Michelman, Inc., 9080 Shell Road, Cincinnatti, Ohio, 45236-1299; SERFENE®121 which is a polyvinylidene chloride (PVDC) latex available from Morton International Specialty Chemicals Group, 333 West Wacker Drive, Chicago, Ill., 60606-1292, and GEON$^{SM}$650X18 LATEX which is a water-based polyvinylidene chloride available from B. F. Goodrich, 9911 Brecksville Road, Cleveland, Ohio, 44141-3247. The physical characteristics and properties of these commercially available materials are further described in technical data sheets which are incorporated herein by reference.

The aforementioned polymer dispersions may be combined with other materials to impart specific characteristics to the primer coat. For example, a pigment or mineral filler, such as but not limited to, aqueous dispersions of clay, calcium carbonate or mica, may be incorporated into the coating to provide improved leveling, smoothing and sealing of a rough or porous substrate. Also, wax emulsions, thickening agents and antifoaming agents may be used in the primer formulations. If the primer includes a wax component, it is typically present in the amount of 5–30 wt. %.

The solids content of the primer coat is preferably greater than 20% to result in sufficient dry add-on levels, preferably 1 to 8 lbs/3MSF, and to reduce drying demands. The viscosity of the primer coat is preferably in the range of 200 to 1000 cps (Brookfield, 50 rpm) to avoid excessive penetration into the substrate. Typically, at least one primer coat is applied to the substrate surface, but in alternate embodiments at least one additional primer coat may be applied prior to the application of the top coat.

The top coat forms a pinhole-free film serving as a barrier to water, water vapor and grease. The top coat comprises a water based dispersion of a polymer selected from the group comprising acrylic polymers, acrylic copolymers, styrene-butadiene copolymers or polyvinylidene chloride. Preferred polymers or dispersions that may be used in the top coat include, but are not limited to, Aquabloc™H; GEON$^{SM}$650X18 LATEX; UNOCAL 76 RES 4105 which is a water-based styrene-butadiene rubber dispersion; and VAPORCOAT which is a water-based acrylic/wax emulsion available from Michelman. The physical characteristics and properties of these commercially available materials are further described in technical data sheets which are incorporated herein by reference. Other coating compositions that may be used in the invention are disclosed in copending U.S. patent application Ser. No. 08/290,626 to Ma et al. entitled "REPULPABLE AQUEOUS BARRIER COATINGS AND RELATED PAPER STOCKS" filed concurrently, and are incorporated herein by reference.

The top coat may comprise a mixture of one or more of the polymers with a wax. The dried top coat preferably contains 15–90 wt. % of the polymer and 80–5 wt. % of the wax. The wax component is preferably paraffin wax but can also be selected from the group comprising microcrystalline wax, polyethylene or a blend of two or more of said waxes.

The solids content of the top coat is generally greater than 35% to result in sufficient dry add-on levels and to reduce the drying demands. The top coating has a viscosity between 200 to 1200 cps (Brookfield, 50 rpm) to minimize penetration into the primed substrate and promote formation of a surface film. Typical dry add-on levels for the top coat are in the range of 2 to 10 lb/3MSF. In alternate embodiments, additional top coat layers may be added over the prior top coat. Generally, the primer and top coatings have total dry coating weights on the substrate in the range of 1–20 lbs per 3,000 sq. feet.

Other additional components of the primer and top coatings may include thickening agents, defoaming or antifoaming agents, pigments, crosslinking agents, slip additives, release agents and antiblocking agents.

Substrates employed in the invention are cellulose-based materials and include a variety of coated and uncoated paper and paperboard, including bleached or unbleached, hardwood or softwood, virgin or recycled, and clay coated or uncoated forms of paper or paperboard. The basis weight of the substrates are in the range of 20 to 300 lbs per 3,000 sq. ft. and the thicknesses range from 0.004 to 0.025 inches. A preferred substrate is paper and is selected from the group comprising bleached paper, clay-coated bleached paper, unbleached paper or recycled paper.

The water based coatings of the invention are applied as aqueous dispersions to the substrate by any method of coating suitable for water based coatings. Examples of suitable coating methods include conventional methods such as air knife coating, blade coating, metering roll coating, gravure coating, rod coating, curtain coating and spraying. Generally some type of elevated temperature drying will be required in order to dry the water based coatings at an acceptable production speed. Suitable drying methods include hot air drying, infrared drying, direct flame drying and drying by contact with a heated drum.

The recyclable paper stock of the invention is formed into a package or container having water resistance, grease resistance and moisture vapor barrier characteristics. In preferred applications the water-based coating corresponds to a moisture vapor barrier located in the internal structure of the package or container. The coating on the substrate surface which corresponds to the interior structure of a package or container performs multiple functions. It provides properties required for the containment of liquid or solid materials; water resistance, grease resistance, moisture vapor protection and FDA compliance.

In a preferred embodiment, the substrate is a calendered, kraft paper with a basis weight of 50 lb/3MSF. The primer is an ethylene-vinyl acetate emulsion with a solids content of 55% and a viscosity of 400 to 600 cps. The primer is applied using direct gravure resulting in a dry add-on level of 1–2 lbs/3MSF. The primer coat is dried by passing through hot air ovens set at 200° F. prior to application of the top coat. The top coat is preferably a mixture of acrylic and wax emulsions. Generally, this top coating has a viscosity of 800 to 1200 cps. The top coat is applied at a dry add-on level of 6 to 8 lbs/3MSF using a Meyer rod assembly consisting of two wire wound rods in series, each rod designated #9. The coated substrate is again passed through hot air ovens set at 200° F. prior to entering a rewind. The optimum drying for this system is obtained with oven set temperatures of 200°–250° F. when the line speed is 400 fpm.

The following Examples, 1 to 7, represent the various primer and top coat formulations that may be used in producing the coated paper stocks of the invention. In particular, Example 6 illustrates a substrate coated with one primer coat and two top coats; and Example 7 illustrates a substrate coated with two primer coats and one top coat. In the examples the coating weights referred to are dry coating weights unless otherwise specified.

EXAMPLE 1

Substrate is a 50 lb/3MSF sized calendered kraft paper. The primer coat is 2 lb/3MSF of Aquabloc™H, a water-based acrylic/wax emulsion, 44% solids, viscosity 672 cps, applied using direct gravure and dried using hot air ovens set at 200° F. The top coat is 6 lb/3MSF of the same water-based acrylic emulsion as the primer coat and is applied using two Meyer rods in series. The top coat is dried using hot air ovens set at 200° F. Aquabloc™H is available from ADM Tronics Unlimited, Inc., 224-S Pegasus Avenue, Northvale, N.J., 07647.

EXAMPLE 2

Substrate is a 50 lb/3MSF sized calendered kraft paper. The primer coat is 2 lb/3MSF of Airflex®100 HS, a water-based ethylene vinyl-acetate emulsion, 55% solids, viscosity 410 cps, applied using direct gravure and dried using hot air ovens set at 200° F. The top coat is 7.5 lb/3MSF of VAPORCOAT, a water-based acrylic/wax emulsion, 44% solids, viscosity 850 cps, and is applied using two Meyer rods in series. The top coat is dried using hot air ovens set at 200° F. Airflex®100 HS is available from Air Products and Chemicals, Inc., Allentown, Pa., 18195 and VAPORCOAT is available from Michelman, Inc., 9080 Shell Road, Cincinnatti, Ohio, 45236-1299.

EXAMPLE 3

Substrate is a 50 lb/3MSF sized kraft paper. The primer coat is 2 lb/3MSF of PRECOAT 44, a water-based acrylic emulsion, 44% solids, viscosity 200 cps, applied using direct gravure and dried using hot air ovens set at 200° F. The top coat is 7.0 lb/3MSF of VAPORCOAT a water-based acrylic/wax emulsion, different than the primer coat, 44% solids, viscosity 1130 cps, and is applied using two Meyer rods in series. The top coat is dried using hot air ovens set at 200° F. PRECOAT 44 is available from Michelman, Inc.

EXAMPLE 4

Substrate is a 50 lb/3MSF sized kraft paper. The primer coat is 3 lb/3MSF of a mixture of 90% GEON$^{SM}$650X18 LATEX, a water-based polyvinylidene chloride and 10% of MOBILCER$^{SM}$216, wax emulsion. The primer coat is 53% solids, viscosity 412 cps, applied using a Meyer rod and dried using hot air ovens set at 220° F. The top coat is 7.0 lb/3MSF of the same composition as the primer coat and is applied using a Meyer rod and dried the same as the primer coat. GEON$^{SM}$650X18 LATEX is available from B. F. Goodrich, 9911 Brecksville Road, Cleveland, Ohio, 44141-3247 and MOBILCER$^{SM}$216 is available from Mobil Oil Corp., Gallows Road, Fairfax, Va., 22037-001.

EXAMPLE 5

Substrate is a 50 lb/3MSF sized kraft paper. The primer coat is 2 lb/3MSF of AIRFLEX$^{SM}$100 HS, a water-based ethylene-vinyl acetate emulsion, 55% solids, viscosity 228 cps, applied using direct gravure and dried using hot air ovens set at 220° F. The top coat is 8.0 lb/3MSF of a mixture of 90% UNOCAL 76 RES 4105, a water based styrene-butadiene rubber and 10% of MOBILCER J, wax emulsion. The top coat is 50% solids, viscosity 570 cps, and is applied using a Meyer rod. The top coat is dried using hot air ovens set at 220° F. UNOCAL 76 RES 4105 is available from Unocal Chemicals & Minerals, 1700E Golf Road, Schaumsburg, Ill., 60173-5862 and MOBILCER J WAX EMULSION is available from Mobil Oil Corp.

EXAMPLE 6

This example illustrates a 50 lb/3MSF unbleached kraft paper substrate coated with a primer coat and two top coats. The primer coat is 3 lb/3MSF of AIRFLEX$^{SM}$100 HS, a water-based ethylene-vinyl acetate emulsion with clay and wax, 23.2% solids, viscosity 250 cps, applied at the size press. Astroplate clay available from English China Clay International, 5775 Peachtree-Dunwoody Road, Atlanta, Ga., 30342 and Mobilcer 216 Wax from Mobil Oil Corp. were included in the primer composition.

Both top coats are Aquabloc™H, a water-based acrylic/wax emulsion, 44% solids, viscosity 672 cps, applied using direct gravure and dried using hot air ovens set at 285° F. The top coat weight of both coatings is 4.4 lb/3MSF. The total product has a coating weight of 7.4 lb/3MSF.

EXAMPLE 7

This example illustrates a 50 lb/3MSF unbleached kraft paper substrate coated with two primer coats and one top coat. The first primer coat is 5.27 lb/3MSF of AIRFLEX$^{SM}$100 HS, a water-based ethylene-vinyl acetate emulsion, 56% solids, viscosity 320 cps, applied with a Meyer rod and dried at 215° F. The second primer coat is 2.43 lb/3MSF of PRECOAT 44, a water-based acrylic emulsion, 44% solids, viscosity 300 cps, applied using a Meyer rod and dried at 215° F.

The top coat is 3.81 lb/3MSF of VAPORCOAT, a water-based acrylic/wax emulsion, 45% solids, viscosity 950 cps, applied using a Meyer rod and dried at 215° F. The total product has a coat weight of 11.51 lb/3MSF.

The functional properties of the coated paper stocks prepared in Examples 1 to 7 are summarized in TABLE I below. In addition, comparisons with two controls, one an uncoated substrate and the other a substrate coated with a 0.5 ml low density polyethylene (PE) extrusion coating, are included in TABLE I. The coating weight of the PE coated substrate is approximately 7 lb/3MSF.

The water vapor transmission rate, water resistance (5 min Cobb test) and grease resistance (kit levels) of each of the samples were measured. These functional properties were determined according to following procedures.

The water vapor transmission rate was determined using TAPPI method T464 om-90 which states "Gravimetric determination of water vapor transmission rate of sheet materials at high temperature and humidity" provides a means of measuring under standardized conditions, the ability of a material to protect against undesirable moisture changes due to the transmission of water vapor through the material. A transmission rate of 3 gm/100 sq"/24 hr., indicates better protection for packaged contents from moisture loss or gain than a transmission rate of 10 gm/100 sq"/24 hr.

The Cobb test, TAPPI method T442 om-84, determines how much water is absorbed by paper and paperboard in a given length of time. Generally for sized materials this measurement is useful in determining the water resistant properties of water-based coatings. The lower the result, the more water resistant the material. A material with a Cobb of 3.45 gm/100 sq" in 10 minutes is less resistant to water than a material with a Cobb of 0.03 gm/100 sq" in 10 minutes. The length of time of the test is dependent upon the substrate being tested. Sized materials will be tested for 120 seconds, whereas, a heavily coated corrugated sample may be tested for 16 hours.

The method used for measuring grease resistance is the Kit Test, USEFUL METHOD 557. This test measures the grease resistance of paper and paperboard materials which are treated at the wet end with fluorochemical sizing agents. This test was not designed to measure grease resistance of continuous films but the results obtained are useful and accepted as an indication of general grease resistance. The higher the Kit test level the better the grease resistance.

TABLE I

FUNCTIONAL PROPERTIES OF EXAMPLES 1 TO 7

| MATERIAL TYPE | WVTR @ 100° F. at 90% RH g/100 in²/24 hr | 5 min Cobb g/100 in² | KIT LEVEL |
| --- | --- | --- | --- |
| EXAMPLE 1 | 10 | 0.06 | 12 |
| EXAMPLE 2 | 3 | 0.15 | 12 |
| EXAMPLE 3 | 3 | 0.03 | 12 |
| EXAMPLE 4 | 12 | 1.17 | 6 |
| EXAMPLE 5 | 8 | 0.39 | 12 |
| PRIMER EXAMPLE 2 | >100 | 0.75 | 1 |
| CONTROL-LDPE COATED | 4 | 0.01 | 12 |
| CONTROL-UNCOATED | >100 | 3 | 0 |
| EXAMPLE 6 | 21 | 2.5 | 10 |
| EXAMPLE 7 | 2.5 | — | — |

As shown by the results in TABLE I, the coated paper stocks of the invention provide water resistance, grease resistance and moisture vapor barrier characteristics comparable to polyethylene films. As further illustrated by the results above, a primer coat alone does not impart acceptable grease resistance or moisture vapor barrier characteristics to the coated substrate.

REPULPABILITY OF INVENTION COATINGS

Generally, polyethylene films and coatings are used in paper-based packaging to provide barrier properties, but their presence restricts the recyclability of the packaging to mills that possess expensive separation and screening equipment. Paper products produced using the method and coatings of the invention were evaluated for their repulpability in the following examples. Repulpability was assessed by disintegrating coated paper under a variety of conditions. In general, handsheets were formed from the resulting pulp slurries and evaluated for visual defects and stickies.

The coated papers of the invention showed good repulpability at elevated pH. The following examples illustrate that with adjustments of pH and length of time in the pulper, the coated papers of the invention are completely repulpable. Repulping of either of these coatings (Example 1 or 2—composition coatings recited above) is accomplished by conventional or slightly modified equipment and practices. This is in contrast to recycling of polyethylene-coated paper based packaging, which requires special repulping equipment and processes. In addition, generally, the presence of a wax component affects the repulpability of the Coatings, in particular the wax type and level. The compositions used in the invention which include a wax component consider the balance between desired barrier performance and repulpability.

MATERIALS AND METHODS

Examples 1 and 2 were tested for repulpability. Twenty-five (25) grams of each sample is combined with 2 liters of water and repulped in a TAPPI disintegrator. Disintegration time, pH and temperature of the water is varied to determine the optimum repulping conditions for each sample. After disintegration, the pulp slurries are formed into standard TAPPI handsheets and dried.

The samples were visually observed and the Kajaani formation index and level of stickies were measured to assess repulpability. The table below summarizes the results of the testing. The visual defects were assessed by randomly coding the handsheet samples and placing them against a natural light source. Defects such as flakes, fiber flocs and inclusions were considered in assigning a rank. (See index under table for specifics.) The Kajaani formation index is a measurement of the sample's spatial optical density distribution and is a numerical value indicating the uniformity of the sheet. A higher formation index indicates a more uniform distribution of fibers in the sheet. In measuring the level of stickies, the samples are placed between two sheets of clay-coated folding carton stock with the clay coating against the handsheet sample, This "sandwich" is pressed between two heated (250° F.) platens for 3 minutes, cooled and then separated. The level of stickies is determined by the amount of handsheet fibers adhering to the clay coating.

TABLE II

RESULTS OF REPULPABILITY TESTING

| SAMPLE | REPULPING CONDITIONS | | | VISUAL DEFECTS (1) | KAJAANI INDEX | STICKIES (2) |
| --- | --- | --- | --- | --- | --- | --- |
| | Temp. (°F.) | pH | Time (min.) | | | |
| CONTROL UNCOATED | 100 | 7.0 | 5 | 1 | 31.8 | 0 |
| CONTROL UNCOATED | 100 | 7.0 | 10 | 0 | 36.0 | 0 |
| 1 | 100 | 7.0 | 5 | 4 | 18.7 | 3 |
| 1 | 100 | 7.0 | 10 | 3 | 26.9 | 3 |
| 1 | 160 | 7.0 | 5 | 4 | 20.0 | 3 |
| 1 | 160 | 7.0 | 10 | 3 | 27.8 | 3 |
| 1 | 160 | 10.5 | 5 | 3 | 24.4 | 1 |
| 1 | 145 | 10.5 | 10 | 1 | 32.0 | 0 |
| 2 | 100 | 7.0 | 5 | 4 | 19.7 | 4 |
| 2 | 100 | 7.0 | 10 | 3 | 27.3 | 4 |
| 2 | 160 | 7.0 | 5 | 4 | 21.1 | 3 |
| 2 | 160 | 7.0 | 10 | 3 | 27.8 | 3 |
| 2 | 160 | 10.5 | 5 | 2 | 33.5 | 2 |
| 2 | 160 | 10.5 | 10 | 0 | 34.0 | 1 |
| LDPE COATED | 195 | 7.0 | 10 | 4 | N/A | 4 |

(1) Visual Defects:
  0 = Even formation, no inclusions or flakes
  1 = Some fiber flocs or minor flakes
  2 = Some fiber flocs, some minor inclusions or flakes
  3 = Fiber flocs with many minor inclusions or flakes
  4 = Fiber flocs with severe inclusions (2) Stickies
  0 = No adhesion to surface
  1 = Slight tack, but no fiber loss from handsheet
  2 = Slight fiber loss from handsheet to clay coated surface
  3 = Moderate fiber loss from handsheet
  4 = Severe fiber loss from handsheet

RESULTS OF REPULPABILITY TESTING

In general, as illustrated from the results in TABLE II above, there is a decrease in visual defects and an increase in Kajaani formation index with longer disintegration time and elevated pH. Increases in water temperature had little effect. Stickies improvement was observed only with elevated pH.

In both Examples 1 and 2, considerable visual defects and stickies were observed at all repulping conditions using a neutral pH. Numerous flakes were present on the surface of these handsheets indicating that the coating did not totally disperse. However, when the pH of the repulping water was raised to 10.5 by the introduction of sodium hydroxide, no coating flakes were observed and all three measures of repulpability improved significantly.

It is well known in the industry that polyethylene, or wax coated materials are problematic to the repulping process unless extensive screening and cleaning equipment is used. Even with this equipment, some pieces of coating will pass through to the paper formation section and affect runnability. In addition, fiber yield from polyethylene - or wax-coated products is reduced because of the tendency of fiber adhering to the coating and being removed in the screening process.

Paper recyclability is dependent on the equipment in a mill, there is no standard method to determine the repulpability of paper-based products. In evaluating the samples repulpability, pretreatment of pulp slurries with screens or flotation devices (necessary with many coated papers) prior to handsheet formation were excluded so that the results are applicable to the majority of paper mill reclamation systems.

Constructions that have scores of 0 to 2 on the visual defect and stickies scale and a Kajaani formation index (sheet uniformity) greater than 30 were considered to be repulpable. Based on these criteria, Examples 1 and 2 are repulpable when the pH is adjusted to 10.5. This repulpablitiy is based on the scenario that (1) the material constitutes 100% of the recycled fiber and (2) no cleaning equipment was used.

In comparison as shown in TABLE II the polyethylene extrusion coated sample had a visual defect measurement of 4—showing "fiber flocs with severe inclusions" and a stickies measurement of 4—"severe fiber loss from handsheet". The Kajaani index could not be measured due to the presence of large chunks of polyethylene in the pulp slurry.

BIODEGRADATION OF THE AQUEOUS BARRIER COATINGS

Compostable materials capable of replacing polyethylene barrier films and coatings provide packaging advantages in disposability. Using a soil burial method, the biodegradation rates of five different aqueous coating systems were compared to a polyethylene coating and an uncoated control. The aqueous coatings were superior in biodegradability to the polyethylene coating and similar to the uncoated control. Composting represents a viable disposal method for products using the invention aqueous coating systems.

Although packaging containing polyethylene can be composted, non-degradable fragments of polyethylene remain in the resulting compost. The invention aqueous coatings have an ability to repel water and retard water vapor transmission at levels comparable to polyethylene. The biodegradation rates of some of the invention aqueous coatings are compared to PE coatings and illustrate their advantage in compostability.

MATERIALS AND METHODS

The study was conducted under controlled soil burial conditions. Weight loss in periodically unearthed samples was used as the main criterion for determining biodegradability. Other sample characteristics, such as the presence of holes or cracks, loss of physical integrity and accumulation of biomass, were also considered in the evaluation. Since composting is generally a more dynamic biological process, the degradation of the aqueous materials under soil burial conditions indicates that composting would represent a viable disposal method for paper products coated with these materials.

Four different aqueous coating systems were applied to a 50 lb/3MSF kraft multiwall bag stock substrate. These constructions were previously described in Examples 1, 2, 4 and 5. An uncoated bag stock and a 60 lb/3MSF kraft bag with a 0.5 mil polyethylene (PE) extrusion coating were used as controls. To minimize degradation of the uncoated kraft substrate surface, a structure with coating on both exterior surfaces was formed by joining two sheets of each sample type with an acrylic laminating adhesive (Flexbond 165 from Air Products Co., Allentown, Pa.).

The samples were conditioned at 73° F./50% relative humidity (RH) for 24 hours, and then cut into 3"×1" strips. Each strip was marked with an identification number and weighed. The strips were then placed in 2'×6" potting trays and covered with approximately four inches of a special soil mixture. The soil mixture consisted of three part's peat moss, two part's composted cow manure and one part non-sterile top soil. Seven potting trays, each containing five replicates of the six sample types, were prepared in this manner. The trays were incubated at 32° C. Once a week each tray was uniformly sprinkled with 2000 mL of deionized water. After two weeks, and each week thereafter, five replicates of each sample type were unearthed, cleaned, conditioned and weighed. The conditioning of the samples was at 90° F./10% RH for 24 hours then 73° F./50% RH for 24 hours. The average weight loss for each sample type was calculated and graphed. Visual evidence of deterioration, such as loss of physical integrity and accumulation of biomass on the samples was also noted.

RESULTS AND DISCUSSION

Figure 3:
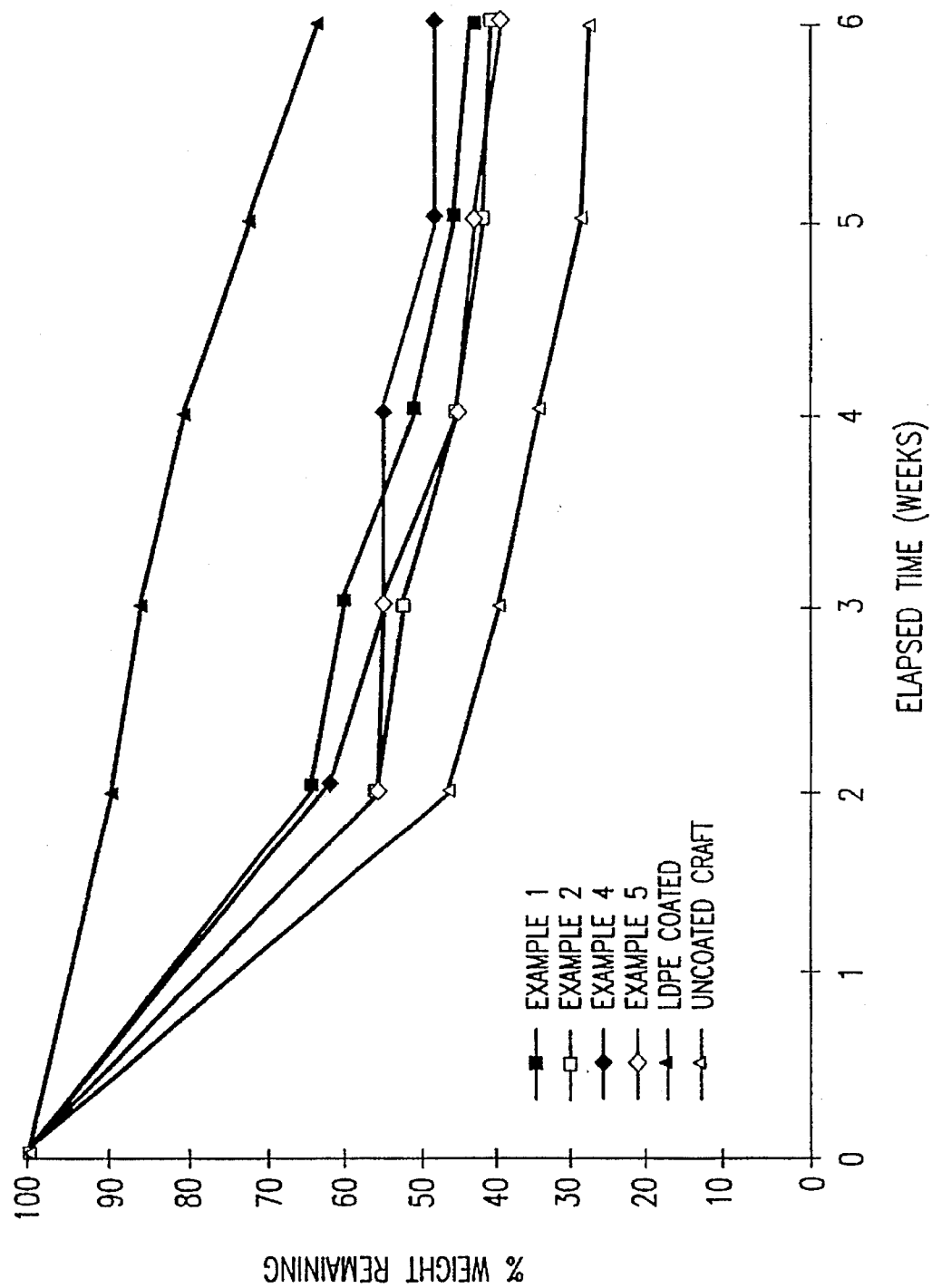
FIG. 3 is a graphic illustration of the compostability/biodegradability of the coated paper stock of the invention in accordance with Examples 1, 2, 4 and 5.

FIG. 3 shows the average weight loss of the six sample types over a six week period. The weight loss in all the aqueous-coated samples were about the same. These coatings lost between 51% to 59% of their original weight after six weeks. Over the same period, the uncoated kraft control lost 72% of its original weight and the PE-coated sample lost only 37% of its weight. After six weeks in the soil, there was a marked physical difference between the aqueous-coated samples and the PE-coated controls. The samples with the aqueous coatings were very fragile and great care was needed to recover them from the soil. Their surfaces contained a moderate amount of fungal growth, and after they were cleaned it was difficult to detect any trace of the coating material. Conversely, the polyethylene-coated samples, remained durable throughout the study. Although some fungi were observed in the soil surrounding the PE-coated samples, the surfaces of the samples were free of growth. After cleaning, unlike the invention coatings, the polyethylene coating was readily distinguishable.

The weight loss data and visual observations clearly show the aqueous coatings biodegraded more rapidly than the polyethylene coating. The presence of fungal growth exclusively on the aqueous-coated samples suggests that these saprophytic organisms are capable of enzymatically depolymerizing these materials, while polyethylene is resistant to this type of attack. The difference in rate of weight loss between aqueous-coated materials and uncoated bag stock is undoubtedly due to the coating's short-term function as a microbial and water barrier to the underlying cellulose.

While biodegradation for aqueous-coated materials was observed in a soil burial study, in a more biologically dynamic process, such as composting, increased rate of biodegradation would be expected. Since, actual production material is preferably coated on one side, the exposed cellulose surface should further enhance the biodegradative rate to be close to or equal to uncoated paper or paperboard, therefore making composting of aqueous-coated packaging grades an acceptable disposal method.

The present invention provides advantages over prior practice. First the invention provides a paper stock which can be recycled by conventional methods without any special measures to remove polyethylene or wax coatings. The water-based coatings of the invention break up and disperse with the paper fibers when the material is run through a standard hydropulper. Second, the paper stock of the invention will break down more readily in a composting environment than conventional polyethylene or wax coated stocks.

It will be recognized by those skilled in the art that the paper stocks of the invention and process have wide application in the production of packages or containers having water resistance, grease resistance and moisture vapor barrier characteristics. Advantageously, the coated paper stocks are more readily recycled than conventional polyethylene or wax coated stocks.

Finally, variations of the water-based coating compositions and coated products from the examples given herein are possible in view of the above disclosure. Therefore, although the invention has been described with reference to certain preferred embodiments, it will be appreciated that other composite structures and processes for their fabrication may be devised, which are nevertheless within the scope and spirit of the invention as defined in the claims appended hereto.

We claim:

1. A method for manufacturing a recyclable and compostable coated paper stock comprising:
    providing a substrate;
    applying a primer coat to a surface of said substrate; said primer coat comprising a water based dispersion of at least one polymer selected from the group consisting of acrylic polymers, acrylic copolymers, polyvinyl acetate, polyvinyl alcohol, ethylene-vinyl acetate, polyethylene vinyl chloride, styrene-butadiene copolymers, polyvinylidene chloride and starch;
    applying at least one top coat over said primer coat;
    said top coat comprising a wax component and a water-based dispersion of at least one polymer selected from the group consisting of acrylic polymers, acrylic copolymers, styrene-butadiene copolymers and polyvinylidene chloride; and
    drying said top coat to form the coated paper stock which is resistant to water, resistant to grease and has moisture vapor barrier characteristics;
    wherein said primer and top coats have total dry coating weights on the substrate in the range of 1 to 20 lbs per 3,000 sq. feet.

2. The method according to claim 1, further comprising drying said primer coat on said substrate surface prior to application of said top coat.

3. The method according to claim 1, wherein said primer coat substantially seals said substrate surface.

4. The method according to claim 1, further comprising applying at least one additional primer coat prior to application of said top coat.

5. The method according to claim 1, further comprising applying at least one additional top coat over said top coat.

6. The method according to claim 1, wherein said primer coat further includes a pigment or mineral filler.

7. The method according to claim 1, wherein said primer coat is a water based dispersion with a solids content greater than 20%.

8. The method according to claim 1, wherein said primer coat is a water based dispersion with a viscosity in the range of 200 to 1000 cps.

9. The method according to claim 1, wherein said primer coat results in dry add-on levels in the range of 1 to 8 lbs per 3,000 sq. ft. on said substrate surface.

10. The method according to claim 1, wherein said substrate comprises a cellulose-based material.

11. The method according to claim 10, wherein said cellulose-based material is paper or paperboard.

12. The method according to claim 1, wherein said substrate has a basis weight in the range of 20 to 300 lbs per 3,000 sq. ft. and a thickness in the range of 0.004 to 0.025 inches.

13. The method according to claim 1, wherein said primer coat further includes 5–30 wt. % of a wax component.

14. The method according to claim 1, wherein said top coat is:
    15–90 wt. % of said polymer and
    80–5 wt. % of said wax component.

15. The method according to claim 1, wherein said wax is selected from the group consisting of paraffin wax, microcrystalline wax, polyethylene and a blend of two or more of said waxes.

16. The method according to claim 1, wherein said top coat results in dry top coat add-on levels in the range of 2 to 10 lbs per 3,000 sq. ft. on said primer coat.

17. The method according to claim 1, wherein said top coat is a water-based dispersion with a solids content greater than 35%.

18. The method according to claim 1, wherein said top coat is a water-based dispersion with a viscosity in the range of 400 to 1200 cps.

19. The method according to claim 1, wherein said primer coat and said top coat further include at least one additional additive selected from the group consisting of thickening agents, defoaming or antifoaming agents, pigments, crosslinking agents, slip additives, release agents and antiblocking agents.

* * * * *